United States Patent
Selinger

(10) Patent No.: US 11,520,979 B2
(45) Date of Patent: *Dec. 6, 2022

(54) COMMUNICATION FULFILLMENT ARCHITECTURES, SYSTEMS, AND METHODS

(71) Applicant: NORDIS, LLC, Coral Springs, FL (US)

(72) Inventor: Ronnie Selinger, Davie, FL (US)

(73) Assignee: NORDIS, LLC, Coral Springs, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/380,009

(22) Filed: Jul. 19, 2021

(65) Prior Publication Data
US 2021/0350069 A1    Nov. 11, 2021

Related U.S. Application Data

(63) Continuation-in-part of application No. 14/120,772, filed on Jun. 25, 2014, now Pat. No. 11,095,576.

(51) Int. Cl.
*G06F 40/186* (2020.01)
*G06F 40/174* (2020.01)
*H04L 67/56* (2022.01)

(52) U.S. Cl.
CPC ......... *G06F 40/186* (2020.01); *G06F 40/174* (2020.01); *H04L 67/56* (2022.05)

(58) Field of Classification Search
CPC ... G06F 40/174; G06F 40/186; G06Q 30/018; H04L 51/02; H04L 67/28; H04W 4/14
See application file for complete search history.

(56) References Cited

U.S. PATENT DOCUMENTS

| | | | |
|---|---|---|---|
| 2004/0064550 A1* | 4/2004 | Sakata | H04L 67/34 709/224 |
| 2005/0141028 A1* | 6/2005 | Koppich | G06F 16/93 358/1.15 |
| 2006/0004642 A1* | 1/2006 | Libman | G06Q 30/0247 705/14.49 |
| 2012/0179677 A1* | 7/2012 | Roselli | G06Q 10/10 707/736 |

* cited by examiner

*Primary Examiner* — Normin Abedin
(74) *Attorney, Agent, or Firm* — Squire Patton Boggs (US) LLP

(57) ABSTRACT

A client-user implemented document and communication creation system for generating a communication using a remote terminal remote from the system, can include at least one memory including computer program instructions and at least one processor that may be accessed remotely by the terminal. The at least one memory and the computer program instructions can further be configured to, with the at least one processor, cause the system at least to receive client-user specified data insertion instructions comprising client-user specified data from the remote terminal to the processor. The at least one memory and the computer program instructions can additionally be configured to, with the at least one processor, cause the system at least to process the transmitted client-user specified data insertion instructions in accordance with one or more client-user generated rule/instruction of the at least one client-user generated rule/instruction.

20 Claims, 8 Drawing Sheets

COMMUNICATION FULFILLMENT ARCHITECTURES, SYSTEMS, AND METHODS

CROSS-REFERENCE TO RELATED APPLICATION

The present application is a continuation-in-part of U.S. patent application Ser. No. 14/120,772, filed Jun. 25, 2014, the entirety of which is hereby incorporated herein by reference.

BACKGROUND

Embodiments of the present disclosure relate to architectures, systems, and methods for communication fulfillment.

The demand for effective communication strategies continues to increase. While various technologies have been created for automating manual operations, these technologies have traditionally relied upon outdated architectures, leading to inefficient results.

SUMMARY

Communication fulfillment architectures, systems, and methods are disclosed herein.

In one aspect, a client-user implemented document and communication creation system for generating a communication using a remote terminal remote from the system, can include at least one memory including computer program instructions and at least one processor that may be accessed remotely by the terminal. The at least one memory and the computer program instructions can be configured to, with the at least one processor, cause the system at least to store at least one client-user generated rule/instruction. The at least one memory and the computer program instructions can also be configured to, with the at least one processor, cause the system at least to provide at least one template wherein the template has a data-insertable zone therein. The at least one memory and the computer program instructions can further be configured to, with the at least one processor, cause the system at least to receive client-user specified data insertion instructions comprising client-user specified data from the remote terminal to the processor. The at least one memory and the computer program instructions can additionally be configured to, with the at least one processor, cause the system at least to process the transmitted client-user specified data insertion instructions in accordance with one or more client-user generated rule/instruction of the at least one client-user generated rule/instruction. The at least one memory and the computer program instructions can also be configured to, with the at least one processor, cause the system at least to insert the received client-user specified data into the zone, in accordance with at least one client-user generated rule/instruction. The at least one memory and the computer program instructions can further be configured to, with the at least one processor, cause the system at least to process a final approval of the communication containing the client-user specified data. The at least one memory and the computer program instructions can additionally be configured to, with the at least one processor, cause the system at least to process a transmission mode specification. The at least one memory and the computer program instructions can also be configured to, with the at least one processor, cause the system at least to transmit the finally approved communication in accordance with the transmission mode specification.

In another aspect, a method for generating a client-user created and implemented document and communication using a terminal that is interconnected remotely to the system can include storing at least one client-user generated rule/instruction. The method can also include providing at least one template. The template can have a data-insertable zone therein. The method can further include receiving client-user specified data insertion instructions that include client-user specified data from the remote terminal to the processor. The client-user specified data can be included directly or referentially, such as by a link or other directions to data stored on a server. The method can additionally include processing the transmitted client-user specified data insertion instructions in accordance with one or more client-user generated rule/instruction of the at least one client-user generated rule/instruction. The method can also include inserting the received client-user specified data into the zone, in accordance with at least one client-user generated rule/instruction. The method can further include processing a final approval of the communication containing the client-user specified data. The method can additionally include processing a transmission mode specification. The method can also include transmitting the finally approved communication in accordance with the transmission mode specification.

BRIEF DESCRIPTION OF THE DRAWINGS

The accompanying drawings, which are incorporated herein and form a part of the specification, illustrate aspects of the present disclosure and, together with the description, further serve to explain the present disclosure and to enable a person skilled in the pertinent art to make and use the present disclosure.

Figure 1:
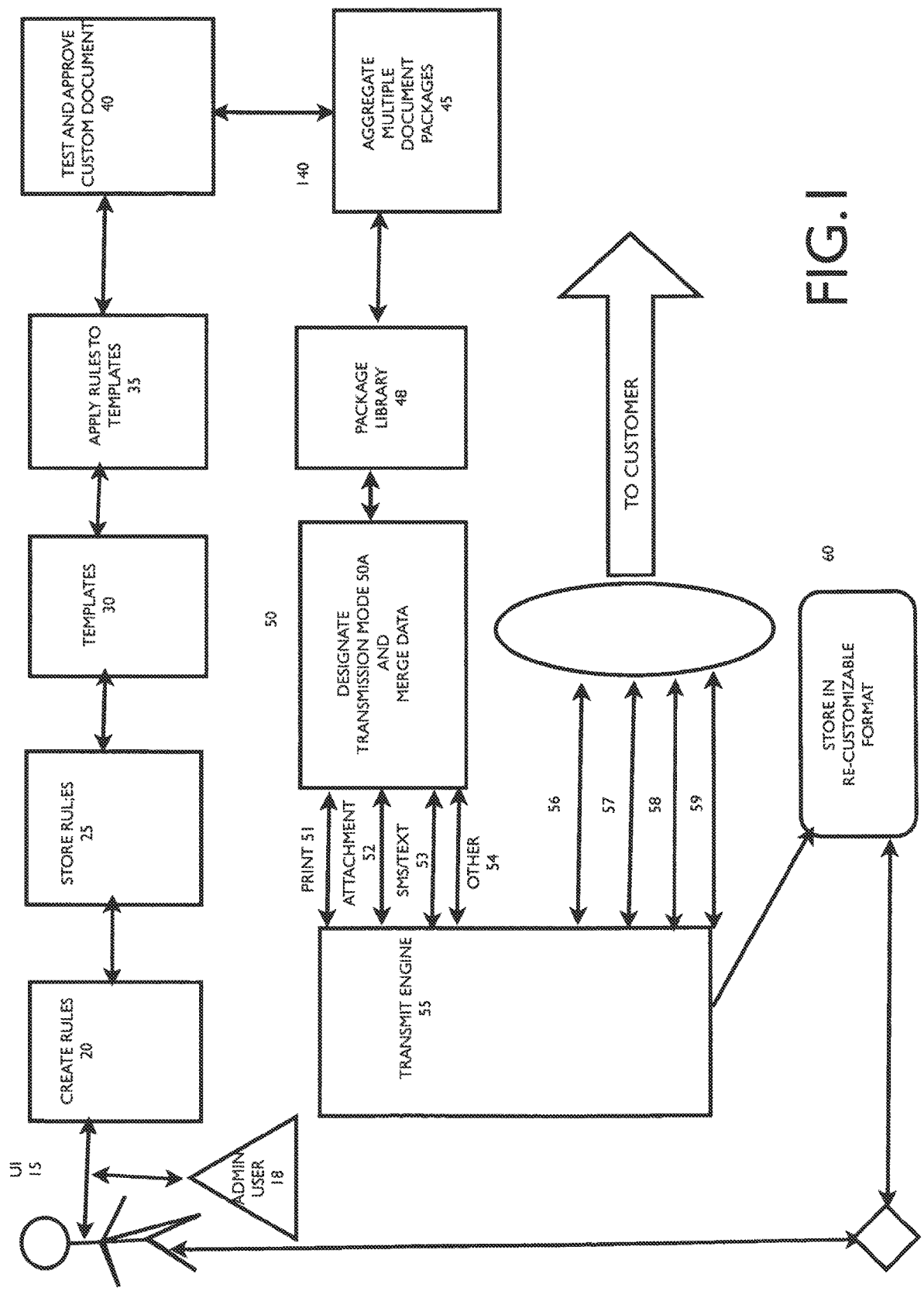
FIG. 1 is a diagrammatic representation of an example of a work-flow configuration of a customized document creation system and methodology in accordance with an embodiment of the present disclosure.

Embodiments of the present disclosure will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of a person skilled in the pertinent art to effect such feature, structure or characteristic in connection with other embodiments whether or not explicitly described. In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The term "variation" of an invention includes any embodiment of the invention, unless expressly specified otherwise. A reference to "another embodiment" in describing an embodiment does not necessarily imply that the referenced embodiment is mutually exclusive with another embodiment (e.g., an embodiment described before the referenced embodiment), unless expressly specified otherwise.

The various processes described herein may be implemented by, e.g., appropriately programmed general purpose computers and computing devices. A processor (e.g., one or more microprocessors, one or more microcontrollers, one or more digital signal processors) may receive instructions (e.g., from a memory or like device), and execute those instructions, thereby performing one or more processes defined by those instructions. For clarity of explanation, the illustrative system embodiment is presented as comprising individual functional blocks (including functional blocks labeled as a "processor" or "engine"). The functions these blocks represent may be provided through the use of either shared or dedicated hardware, including, but not limited to, hardware capable of executing software. For example, the functions of one or more processors presented in FIG. 2, may be provided by a single shared processor or multiple processors. Use of the term "processor" should not be construed to refer exclusively to hardware capable of executing software. Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

A "processor" includes one or more microprocessors, central processing units (CPUs), computing devices, microcontrollers, digital signal processors, or like devices or any combination thereof. Thus, a description of a process is likewise a description of an apparatus for performing the process. The apparatus can include, e.g., a processor and those input devices and output devices that are appropriate to perform the method. Further, programs that implement such methods (as well as other types of data) may be stored and transmitted using a variety of media (e.g., computer readable media) in any desired way. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" can refer to any medium that participates in providing data (e.g., instructions, data structures) that may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Certain embodiments of the present disclosure relate to the field of automated, client-user implemented, secure document creation and distribution to permit customized documents to be created by a client-user and then delivered to third parties designated by the client-user in either printed or electronic format. The system may permit highly customizable documents to be generated by the client-user with little or no input from the system manager by providing the user with multiple templates, content management and process control. This may permit information to be collected from the generating entity or user and merged into multiple documents, campaigns and communications to third parties in multiple formats, according to the client-user's specification. Certain embodiments of the present disclosure permit individual job design, management of the contents of the job, data insertion and manipulation, reporting management and related tools that permit the final documents to be communicated in printed or electronic format, through traditional mail delivery or e-mail, as well as SMS/text messaging and other transmission means. Certain embodiments further provide for the creation of on-line response mean through a proxy module wherein a recipient of a proxy or other material may respond to the proxy by electronic response or hard copy response, which may then be converted to electronic compilation of responses. Certain embodiments of the present disclosure also provide for a compliance module to permit material to be reviewed at various points in the production cycle to ensure compliance with a client-user's internal rules and compliance with state, federal and other statutory and regulatory rules.

Certain embodiments of the present disclosure were developed to automate the fulfillment of communications for a variety of registered client/customers through a method of multi-client data feeds into a web-enabled software-as-a-service (SaaS) platform to provide self-service program communications served to third-parties designated by customer via developed templates, data-rules, and communication types and driven to either a print/mail production facility or digital gateway.

Certain embodiments are both an internal and external platform designed for client-driven, self-service communications and also for print production management and delivery automation for production facilities.

The client-driven, self-service interface of certain embodiments can be used to develop and edit and delivery dynamic communications based on single data feed or established routine automated data feed using either custom file transmissions or API connectivity.

The print production management and delivery automation interface can be used by an established company serving out the platform to manage the registered agent client users that have access to the client-driven tools interface.

Figure 2:
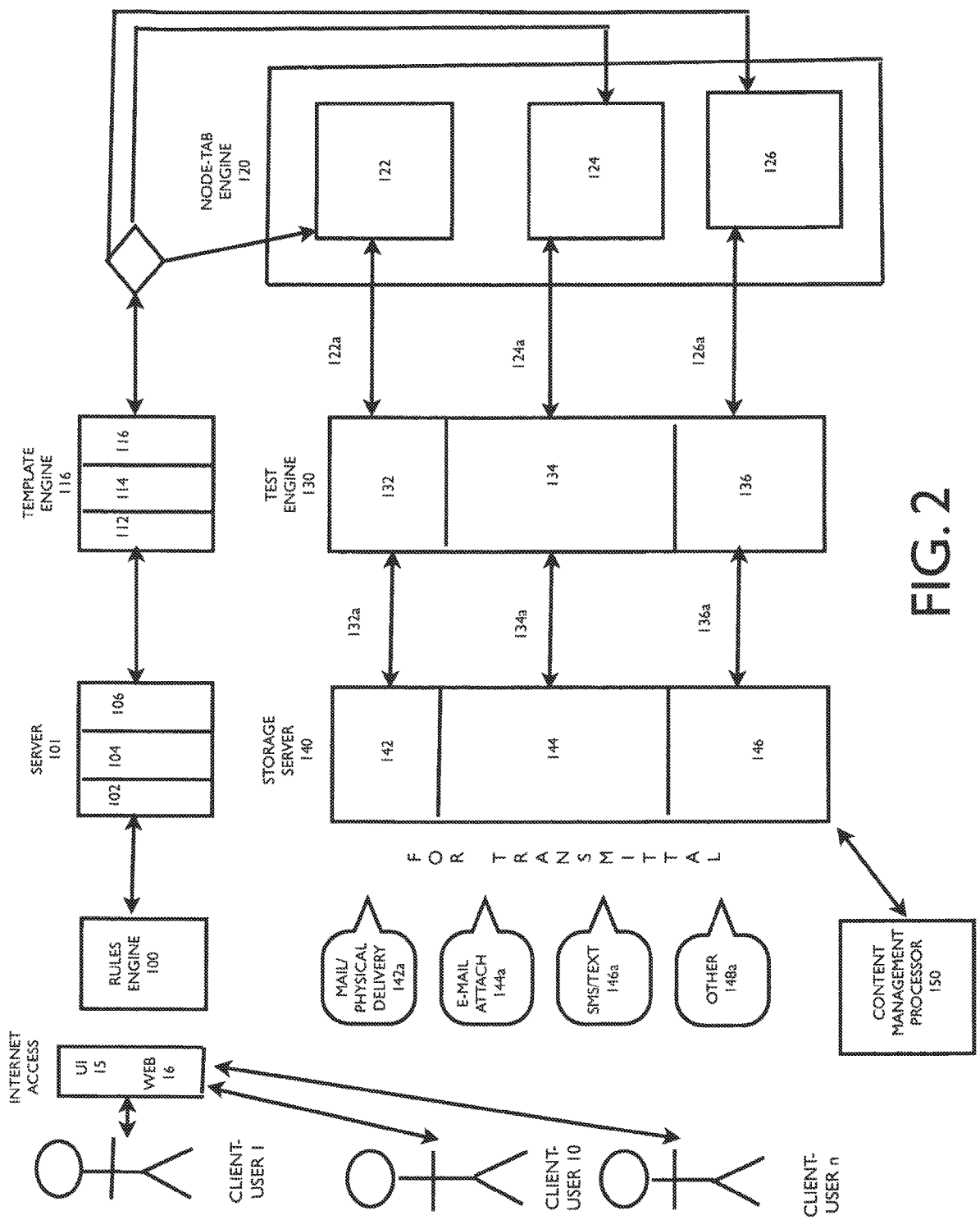
FIG. 2 is a diagrammatic representation of an example of a generalized configuration of a number of customized document creation system interface modules in accordance with an embodiment of the present disclosure.
Figure 5:
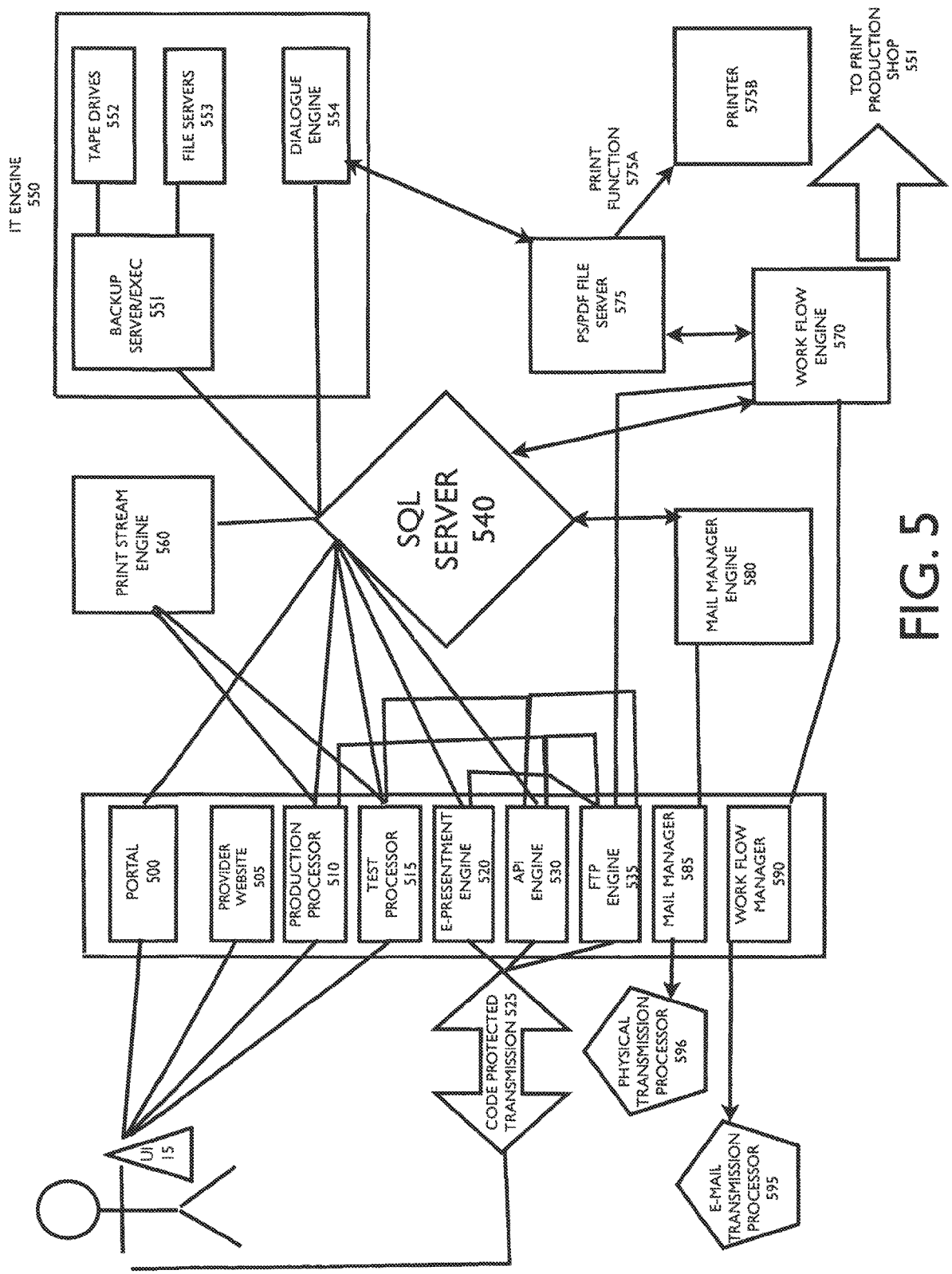
FIG. 5 is an access point/distribution point flowchart illustrating a custom document methodology and system for generation, finalization and transmittal of customized documents by the system in accordance with an embodiment of the present disclosure.

The web-enabled SaaS for registered client-users may provide secure access based on registered clients (see, for example, FIG. 2 and FIG. 5). Moreover, certain embodiments may provide multi-tenant support of more than one customer who can communicate to designated third parties. The self-service platform of certain embodiments may permit automated print/mail and digital delivery.

Figure 3:
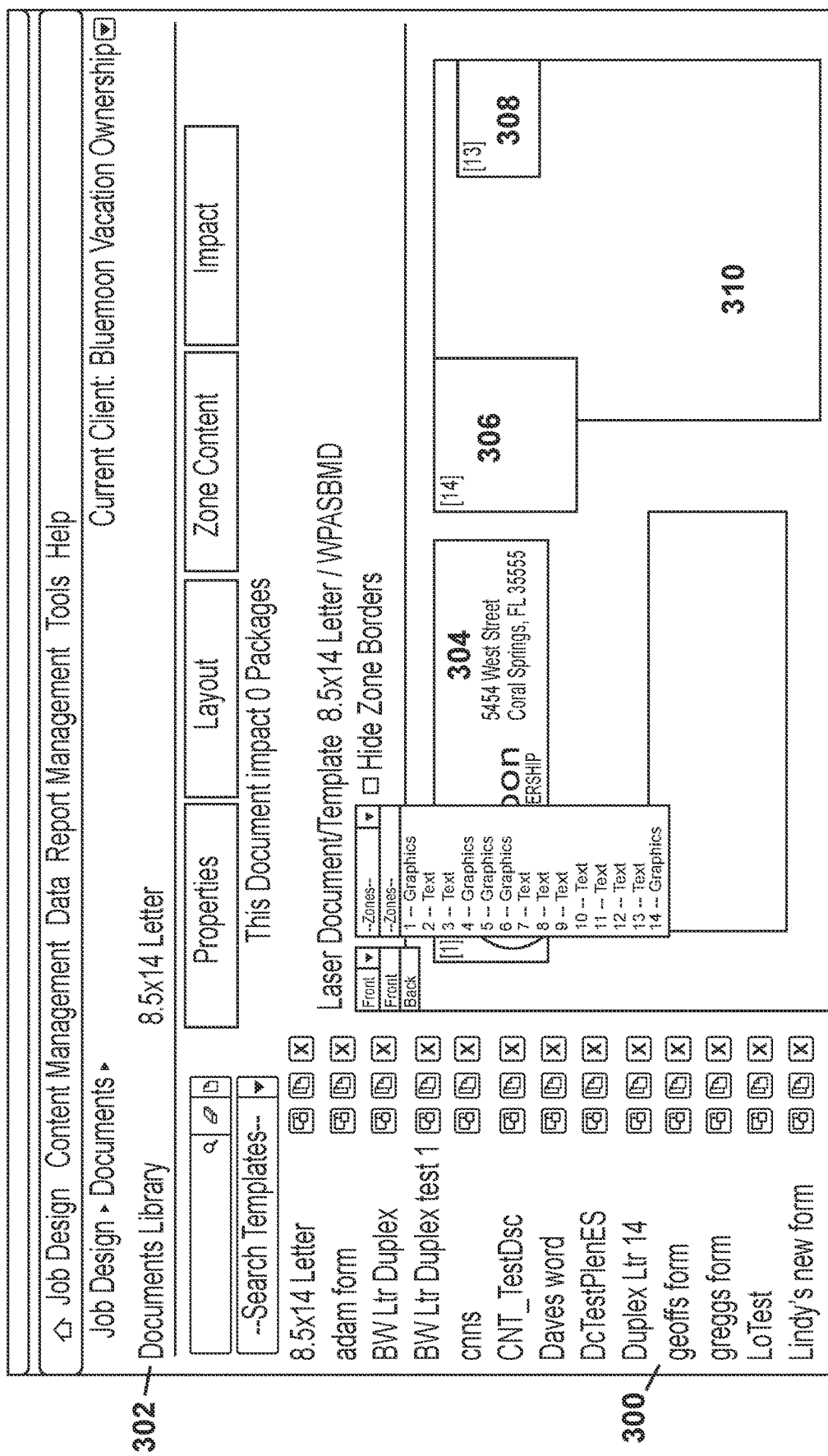
FIG. 3 is an example of a multi-zone layout employed in a customized document creation system in accordance with an embodiment of the present disclosure.

Certain embodiments may provide for client-user driven external communications to third parties (see, for example, FIGS. 1, 2 and 3). This approach may rely on a document and template inventories. Moreover, certain embodiments may enable communication package management. Furthermore, certain embodiments may provide associated data mapping, rules, and dynamic-content elements. An associated physical inventory management can be provided by communication package. There can be an associated data mapping, rules, and dynamic-content elements. There can be restriction to delivery or guaranteed second party approval requirements. Furthermore, certain embodiments may permit reporting and archive retrieval.

Figure 4:
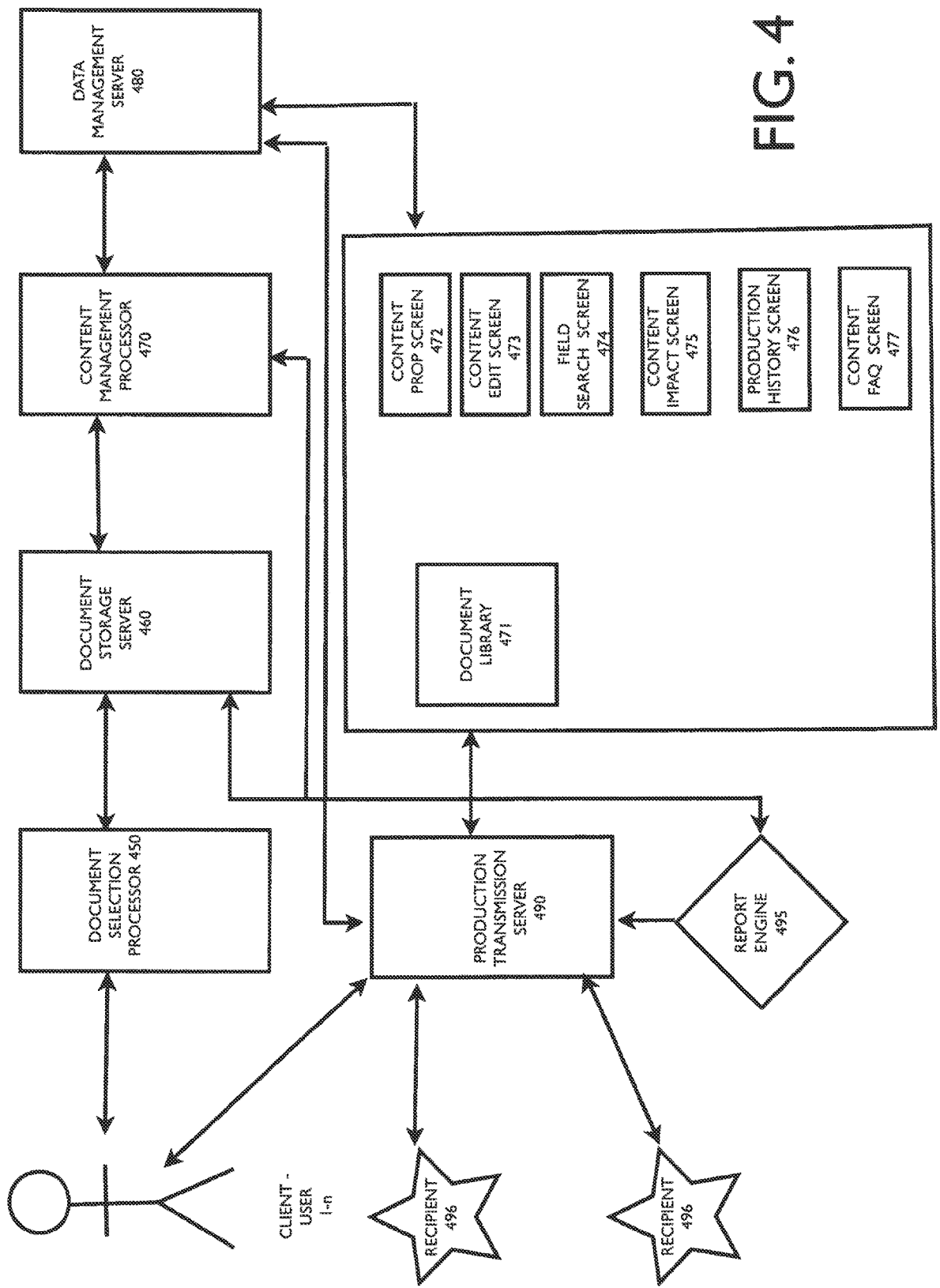
FIG. 4 is diagram illustrating the compilation of packages for transmittal as an example of a multi-documents generation by a customized document creation system in accordance with an embodiment of the present disclosure.

Certain embodiments may provide an automation and management framework for production facility utilization (see, for example, FIGS. 1, 4, and 5). Certain embodiments may provide automation and may permit access to print/mail production. Additionally, certain embodiments may provide access to a digital delivery gateway. An associated physical inventory management by package can be provided. Furthermore, certain embodiments can provide communication job management and reporting by fulfillment type, date/time.

The generation of documents for distribution to third parties in, for example, ad campaigns or other forms of mailings, has typically been a complicated manual task involving the labor of a number of people and often requiring repeated back and forth between the entity seeking to create the documents and the printer or entity that is responsible for actually generating the document. This is often further exacerbated when the creating entity has multiple layers of personnel who are required to provide input to the document and approval for the interim and final document product.

All of this creates delay and the real possibility of errors which are undetected until late in the document creation cycle. The generation of such customized documents (e.g., campaigns, mass mailings, reports, and the like) has required the expense and participation of a number of professionals, both inside the creating entity and within the publishing entity and has been beyond the ability of automation. When automation has been attempted, it has generally required a custom application or a special-purpose system that is not available to the majority of users.

One existing technique is to use HTML, or XML coding to define fields and other decision trees that can be used to build a document. Such techniques require substantial knowledge of coding and prevent those who understand the document best from being closely involved with the generation of a document.

Oftentimes a user (creator) creates a document or a program according to a work process flow as is described below. First, the user (creator) creates a document or a program and edits the document until the creator feels that the document has reached a certain level of completion. Then, the user submits the document to a supervisor who checks the document. Then, the user edits the document once more based on remarks and corrections made by the supervisor. From there, the document might be submitted to a printer or other outside entity for formatting and creation of a mock-up or sample which would then be returned to the user or supervisor for approval.

According to the work process flow as is described above, a document or a program may be created without notable problems when the user (creator) understands what kind of document the supervisor (checker) is demanding and where the entity that is ultimately going to generate the document also understands what kind of document is to be ultimately created. However, when there is a misunderstanding on the creator's side to and a document is created that is significantly different from what the supervisor (checker) has in mind, the supervisor (checker) has to make significant changes to the document created by the user (creator), this being a burden on the supervisor's side, and the user (creator) has to make extensive edits on his/her document based on instructions and advice from the supervisor, this being a burden on the user's side. In such a case, it creates a burden on both the user (creator) and the supervisor (checker) and delays the generation of a document that can be transmitted to the third party for the preparation of the final proof.

Accordingly, in recent years and continuing into the present, various techniques are being developed for enabling a creator and a checker to create and edit work such as a document in a collaborative manner so as to reduce the burden of both the creator and the checker.

Document-centric workflows are fundamental to many organizations. At the same time, document sharing, workflow support, user authentication and other workflow-enabling services are often locked within organizational firewalls for various reasons, ranging from the organization's security policies to software license concerns. Internal processes, however optimized and important, may only be a small part of the business of large companies. They may not be able to exist without collaborating with customers, partners, suppliers and vendors.

Various types of external collaborations are emerging too: companies forming alliances, participating in standards bodies or forums, acquiring government certifications, undergoing external audits, and outsourcing or merging. These are just a few examples of 'non-contained' document workflows. These cross-organizational workflows often carry information of different levels of sensitivity: auditing information, prospective mergers and acquisitions, tender proposals or patent applications, etc., many of which may involve multiple participants from different organizations, and security domains that require different levels of access.

Despite the growing availability of cloud-based and other web services, it is often difficult, undesirable or impracticable to involve third party services to provide access control and workflow order enforcement as both the confidential document contents and the authentication of workflow participants may need to be fully disclosed to such a service. The situation can be further exacerbated if the existence of the workflow itself is desired to remain confidential. As a result, documents are often delivered over traditional e-mails or posted on portable storage media, such as flash drives, CD, DVD, etc.

The situation may further be complicated by increasing document complexity. Increased complexity includes the separation of a document presentation and its content for reuse, variable data publishing and multiple presentations embedded within the same document for a delivery over different channels. Documents have often become composites of differently formatted files and their fragments "glued" together by various applications.

Thus, a continuing need exists for a system that allows for the secure creation and distribution of customized documents by client-users to be delivered to third parties either in printed or electronic format. There is further a continuing need for a system to permit the automatic generation of customized documents with direct client-user input that is easy to use, permits the generation of substantially final documents without the need, after initial implementation, for third-party (printer) intervention and is accessible to a wide group of diverse end-users. Certain embodiments of the present disclosure solve these needs and others as described below.

According to an embodiment of the present disclosure, a document creating system can be provided to permit a client-user (including a plurality of persons who are associated with a client or customer, using a plurality of terminal apparatuses that are interconnected via a network-interconnection via a network such as the Internet can be an example of connecting remotely) to create a document by providing input data and custom client-defined rules, the system including setting a condition for creating initial client-defined rules. The system can permit client implementation to allow the user to maintain and keep document versions and keep making changes as needed to create a document at a terminal apparatus of the client. The system can further provide client-user editing for the document created at the terminal apparatus by additional appropriately designated client-users who have approval authority and may edit at either the terminal apparatus or on the fly at another terminal apparatus with the editing function continuing until the final edit condition is satisfied.

According to another embodiment of the present disclosure, a document creating system can be provided for collaboratively creating a document by a plurality of client-user personnel using a plurality of terminal apparatuses that are connected via a network, the system including setting an editing function for realizing the editing method to the document created at the terminal apparatus and permitting the document created at the terminal apparatus to obtain stored data to permit previously used material to be part of the currently created document, in accordance with client-user defined rules.

According to an embodiment of the present disclosure, the custom document creating system of the present disclosure may be realized wherein the system includes a server and a plurality of client-users are simultaneously connected to the server to permit each client-user to create simultaneously individual, unique and customized documents.

According to another embodiment of the present invention, a computer-readable program can be provided that is run on a processor implemented in a document creating system that is connected to a terminal apparatus via a network in a network system and is adapted to realize collaborative creation of a document by one or more client-user personnel, the program being executed by the computer to perform a method comprising setting and implementing client-user defined rules to create customizable documents and set conditions for finalizing a created document for transmittal via printed or electronic means.

According to another embodiment of the present disclosure, a storage medium can store a program of the present invention for use by multiple client-users to generate individual custom documents.

According to another embodiment of the present disclosure, a data structure of a document can be provided and available to each client-user that includes a program of the present disclosure, a document file of a created document or documents, and a program for viewing the document file.

In one aspect, the present disclosure provides a system and methodology for permitting client-users to create customized documents internally and maintain the ability to re-customize the documents. The system includes a server to provide and store a document generation screen to permit access to a document template. The system further comprises a multi-zone content layout with node-tabs for collecting information from a client-user, where the information collected is related to one or more of the zones and may be used in one or more of the documents for creating customized documents.

In yet another aspect of the invention, the system can permit collection of information from either one or more personnel and/or files can be received in an automated manner. The system can then accept the files and information to merge the presentation, data and content for document output in any of a number of electronic forms and hard copy. All of the above may accomplished within a client-user's environment, after initial implementation, for merging information collected from a client-user, either from personnel or automatically, with the document generation screen to create a customized document.

The system can further provide the separation of a document presentation and its contents for reuse, variable data publishing and multiple presentations embedded within the same document for delivery over different channels.

In another aspect, the node-tabs of the multi-zone layout can perform logical actions in response to information collected from the client-user personnel to create packages of customized documents for transmission.

In still another aspect, the logical actions can be selected from a group that includes filling node-tab area and zones, adding information and/or data, removing information and/or data, presenting further information queries, where information and/or data may be client-user generated and may be comprised of pictorial, graphic, text or other input, modifying personnel interaction level, providing stored information and/or data to the client-user, providing tools to the client-user, providing information to the end-user, and presenting the client-user with multiple transmission opportunities.

It is yet another aspect of the present disclosure that the information and/or data may be selected from a group comprised of client-user defined rules and data and/or generic data and further comprised of detailed descriptions, questions, and options, and is in a format selected from a group consisting of text, graphics and other media variations now employed or to be developed in the future.

It is a further aspect of the present disclosure that the system can include one or more storage media to store a set of information and/or data collected or otherwise obtained from each client-user, transmitting means to direct the information to another node-tab for merging with one or more other document templates, whereby the efficiency, accuracy, and consistency of a client-user's creation of custom documents can be enhanced.

In a still further aspect, information can be collected from multiple individuals within and without a client-user, each of whom has been granted access to the system, and is merged with the document template to create a collaborative custom document.

A further aspect of the present disclosure can include security means to permit an administrative end-user to grant access privileges, where the administrative end-user determines a degree of access for other end-users.

It is yet another aspect of the present disclosure to provide a secure means for client-users to transmit data, graphics, text and other material in order to permit the creation of custom documents at a location away from the client-user and to permit secure creation of custom documents at that location.

It is yet another aspect of the present disclosure to provide a secure means for client-users to transmit data, graphics, text and other material in order to permit the creation of custom documents at a location away from the client-user and transmission of those custom documents in a secure manner to designated third-parties.

In a yet further aspect, certain embodiments of the present disclosure further include a processor to store a set of information collected from the end-user as a client-user profile and map the information from the client-user profile to re-generate new custom documents and for merging multiple document templates to enhance the efficiency, accuracy, and consistency of a client-user's creation of customized documents.

In another aspect, the node-tab/merge engine can be configured to merge the information collected from the end-user with multiple document templates to create multiple customized documents.

In yet another aspect, the document template can be a multimedia document template and the customized document is a multimedia document.

In another aspect, certain embodiments of the present disclosure further provide for the creation of on-line response mean through a proxy module wherein a recipient of a proxy or other material may respond to the proxy by electronic response or hard copy response, which may then be converted to electronic compilation of responses.

In yet another aspect, certain embodiments of the present disclosure also provide for a compliance module to permit material to be reviewed at various points in the production cycle to ensure compliance with a client-user's internal rules and compliance with state, federal and other statutory and regulatory rules. Such compliance rules may, illustratively, fall into categories such as rules by industry or communication type, such as marketing, financial, medical, HOA and others. The rules may also fall into multiple categories, such as medical billing or legal content verbiage and may have additional rules for specific verticals. The rules may also regard content and limitation factors, qualifications or safe harbor provisions. Furthermore, the rules may have internal values such as how often a certain type of communication may be sent before it is modified. The above compliance indications are illustrative only.

Some specific terminology will be used to describe the method, system, and computer program product according to the principles of the present invention. These terms are used to describe the concepts that they represent to reduce any ambiguity that may result if the terms are used without such specific definitions. Among the various components and entities that may be a part of the automated, user implemented custom document creation, management and transmission system of the instant invention, the following terminology may be advantageously employed:

Customizable Document, also referred to as a Customized Document or custom document, can be a document that can take many different final forms depending on options and decisions by a client-user. As a non-limiting example, a custom document could be a part of an ad campaign, mailer, invoice, letter or other document for delivery in either printed or electronic form, that includes optional client-user customized material based on a number of factors as determined by the client-user and client-user rules, and other factors related to such a document. A custom document can be created by the use of a plurality of node-tabs, where the use of each nod-tab is determined by decisions and choices made by a client-user. A Customizable Document may also be referred to as a Template.

Node Tab can refer to a general zone that may be accessed by and provided to one or more client-users to make a choice on a custom document. The Node Tab may be further customizable by the use of client-user data and represents data specific to a client-user and the specific use for which the custom document is designed. Non-limiting examples of such client-user data include name, address, start and end dates, logos, visual elements, stored data and retrieved data. This combination may permit the generation of highly customizable custom documents.

Option Flow can refer to the general customization path that presents the client-user with the options that may be selected and further sets forth a general order of presentation of these options, where the grouping of these options is in logical activities and steps of the Option Flow. Option Flow may have certain features accessible to multiple personnel within a client-user environment and may simultaneously have other features accessible to only personnel with designated access.

Rules/instructions may be the client-user determinations that can be generated by the client-user either for a single project or for multiple projects. The rules/instructions may allow the system to employ the data and other material the client-user provides and options the client-user selects when preparing a final custom document.

Test/Transform is the process of taking the rules/instructions, the Node Tab selections, the Option Flow, and the client-user's options and data, testing them and transforming them into a final custom document.

Content Managed Fields can refer to types of Node-tabs and zones that can be automatically filled by the system via previously defined Rule/Instructions the client-user entered or data previously supplied. For example, if the end-user predefines the content managed fields: Name/Address—Mailing List 1, the system can automatically fill those values in any future document the same client-user begins where the custom document is going to the same group defined by the Mailing List 1. Each client-user can have available content managed fields that can be saved separately for each client-user. Data for a group of personnel for a client-user may also be stored and applied as needed in a collaborative context.

A client-user can refer to an entity, such as a firm, company, partnership, sole-proprietorship, or the like, whose inside and outside personnel and designated third-party consultants/independent contractors etc. who are granted access to the system generate and create a custom document which, upon final approval, becomes a Final Document which may be transmitted in accordance with the requirements and specifications of the client-user. The system and methodology permit a client-user to generate and direct the distribution of custom documents where the client-user controls and implements the fields, options, location, and other metrics to create the final form of a document, including print, electronic, SMS/text and multimedia documents.

FIG. 1 depicts an illustrative example of a configuration of a customized document creation system in accordance with an embodiment of the present disclosure. client-user 1, who for purposes of this example is a person with authority to generate and access a set of rules/instructions 20, creates the rules/instructions 20 for the generation of one or more custom documents. The rules/instructions 20 may be specific for a set of custom documents or may be generic for different types of custom documents. The rules/instructions 20 may also be dynamic in that they may be altered either before initiating the generation of a custom document or may be altered on the fly during the creation of a custom document and applied on the fly to that custom document.

The client-user 1 may access the system via the internet through a client-user interface 15 which is specific to the client-user, or may access the system by logging on to the system provider's website (not shown) and gaining access through a secure entry sign-in. Multiple client-users (1-n) may access the system simultaneously and create individual custom documents at the same time.

Once the client-user 1 has accessed the system, the client-user 1 will store the rules/instructions 20 on a server 25 for subsequent use. It will be appreciated that the individual who creates the rules/instructions does not have to be the individual or individuals who subsequently access the system to generate the custom document. To commence in the creation of a custom document, the client-user 1 accesses the system and any rules/instructions 20 stored therein on server 25 and then accesses the Customizable Document processor 30 to obtain one or more Templates 30A found therein.

Each Template 30A can be obtained via a pull-down listing to permit the client-user 1 to select from a variety of different document layouts and communication objectives. For example, an invoice Template (not shown) can have different Node-tabs from a letter Template (not shown), which can be different from an ad campaign Template (not shown).

The Template 30A can include at least one Node-tab that may permit the client-user 1 to insert data, information, graphics or other material (collectively "data") into a specific zone on the Template 30A. The data may be a function of previously supplied material or may be imported into the zone on the fly at the time of the creation of the custom document. It can also be generated by the rules/instructions or taken from one or more previously generated custom documents, at the discretion and direction of the client-user 1. Certain of the zones may be designated as "Text" while other may be designated as "Graphics" in accordance with criteria set by the client-user 1 or by the system provider and/or by the rules/instructions. Alternatively, the zones may be customizable so as to permit the client-user 1 to vary the location of the zones to further customize the document.

client-user 1 may also view existing custom documents to permit their alteration to create a new custom document in substantially the same manner as is set forth above. Once the client-user 1 has inserted data into the zones that the client-user 1 seeks to fill, the client-user 1 can obtain any additional data and information that the rules/instructions require be inserted into the custom document and can apply the additional data via processor 35 to the Template 30A. In the event that multiple custom documents are to be generated as part of a package, the data, additional data and Rules/Instruction information may be applied to each of the custom documents simultaneously by the processor 35.

The processor 35 may employ a transform and merge engine 38 to aggregate all of the above information and inputs from the client-user 1 and thereafter transmits the custom documents to a test server 40. At the test server 40, the custom documents are reviewed and client-user 1 personnel with administrative/approval authority must sign off on each custom document before it is permitted to be transmitted from the test server 40 for ultimate distribution. In the event that the client-user 1 determines that a custom document should not be transmitted from the test server 40, the custom document may be stored at a client-user 1 specific drive or partitioned storage device 140 for subsequent access (see FIG. 2).

After the creation and approval of each client-user 1 custom document, the various custom documents can be aggregated to create one or more packages 45 which may be stored in device 140 for ultimate transmittal. The creation of packages 45 can be the final step in creating a mailing, via traditional or electronic means, to the ultimate recipient that the client-user 1 is seeking to communicate with. To create the packages 45, the client-user accesses the partitioned storage device 140 and designates those custom documents that will be placed into a package library 48. Those custom documents can be accessed to form multipage packages 45 by designating the custom document that will go into each package 45.

The client-user 1 can designate a package 45 name to permit subsequent identification of the specific package 45 and may advantageously employ a package 45 code to link the input data and custom documents to the output data which will ultimately be the package 45. Commencement and termination dates, mailing envelope designations and other properties of the package may be specified and saved to create the parameters and properties of the package 45.

Once all of the properties are designated and saved, the client-user 1 may start to designate those custom documents that will form part of the specific package 45. A specific custom document can be selected from the package library 48 and associated with the package 45. Once all the custom documents are selected for a specific package 45, the client-user 1 may designate a transmission mode 50a and merge the custom documents into a package 45 via a merge and transmit engine 50. If the designated transmission 50a is by an actual, physical mailing of the package 45, then the package 45 may be transmitted to a print function location 51 (See also FIG. 5, production shop 551) where the package may be printed, addresses may be associated with the package 45, and the package 45 may be transmitted via the specific, physical mailing system designated.

In the event that the transmission mode 50a is electronic, then the package 45 can be electronically assembled, compressed as needed and formed into an attachment 52 in a recipient non-alterable format, to an electronic address (not shown) for transmittal. Similarly, certain packages 45 may be designed to be transmitted in electronic format such as an SMS/Text message 53 where the content of the package 45 may be more limited, in accordance with SMS protocol.

As is generally depicted in the flow diagram of FIG. 1, the completed package 45 can be exported to a transmission processor 55 that is controlled to cause each package 45 to be transmitted (eg. Postal 56, electronic 57, SMS 58, other transmittal mode 59) in accordance with the transmission instructions. The transmission processor 55 may also advantageously transmit the package 45 to a storage device 60 (which may be a part of or associated with the package library 48) where the package 45 may be stored for further customization or for re-customization to create one or more revised custom documents and subsequent packages 45. The transmission processor 55 may transmit the package 45 to the storage device 60 in alterable form so that the various custom documents in each package 45 may be subsequently altered.

FIG. 2 illustrates, in block form, a diagrammatic representation of an example of a generalized configuration of a number of customized document creation system interface modules in accordance with an embodiment of the present disclosure. A client-user 1 may access the system through a client-user 1 interface 15 (also referred to as UI 15) that is specific to the client-user 1 or may access the system through a Web-portal 16 at the supplier's Web site to which the client-user 1 has password protected access.

Certain embodiments of the present disclosure allow the client-user 1 to designate multiple access privilege levels to personnel within the client-user 1. Thus, by way of example, the client-user 1 may designate an administrative user 18 (who may or may not be part of the package 45 design group) to grant access rights and privileges to other personnel, both within and without the client-user 1. The administrative user 18 may designate certain personnel to provide text while others provide graphics and may permit the personnel to communicate with one another to interact to generate the custom document and package 45. One mode for permitting the interaction is to limit the area that each person can access on any given template 31, while another is to create a series of Rule/Instructions that define what area or portion of each template 31 may be accessed by each person.

As is illustrated in FIG. 2 and FIG. 4, multiple client-users 1 through n (hereinafter also referred to as "client 1-n") may access the system at the same time to generate custom documents. Each client-user 1-n may access the system via a UT 15 or a secure entry Web portal. Each client-user 1-n may have established a set of individual rules/instructions which are advantageously stored in a Rules engine 100. As is illustratively shown in FIG. 3, if the client-user 1-n is working on an existing custom document, the client-user 1-n may be presented with an interface that may include a menu 300 that is integrated with the Rules engine 100 and provides, by way of example, access to a document library 302. Alternatively, if the client-user 1-n is starting a new custom document, client-user 1-n may be presented with an interface (not shown) which may include a menu that is integrated with the Templates 30A and provides zones that may be accessed and integrated with text, graphics and other material, in accordance with the dictates of the client-user 1-n. While the client rules/instructions can define the specific inputs and other aspect of the workflow process, the system can also provide the client with automated rejections in the event that the rules/instructions are inherently non-compliant with the submitted data record. Thus, for example, if the field <Statement Balance>, which inherently should have a debit value (money owed), instead reflects a credit balance, the system can suppress the data record and prevent the data record from being mailed. Other automated Rules/Instruction rejections form a part of the system and the above is only intended to be an example of the automated manner in which the system adapts, edits and monitors the work as a function of the Rules/Instruction and the ultimate material output to ensure accuracy.

By way of illustration, and not as a limitation, each client-user 1-n may access server 101 which may be partitioned, either by use of separate storage systems or by software with appropriate firewalls, into multiple storage areas 102, 104 and 106 (the use of three areas is not a limitation and additional areas may be partitioned, depending on the number of client-users 1-n). Each client-user 1-n may commence or continue work on one or more custom documents by accessing a Template 30A from a template engine 110. Multiple components or zones of each Template 30A may be visible to the client-user 1-n.

As an example, there may be a logo zone 304 into which a client-user 1-n may insert a specific letterhead, logo, address or other identifying material which may either be imported by the client-user 1-n, may be stored on the system or may be a part of a previously created custom document found in the storage device 60. The zone may be limited to text or to graphics, in accordance with one or more rules/instructions or may be available for either or for some other form of media insert.

As each zone is either filled or specifically left blank, the Rules/Instruction may be applied to actually insert the text, graphic or other material to the Template 30A to build the custom document. Furthermore, node-tabs may be employed to create and file zones within zones. Thus, for example, a zone 306 may be advantageously established that bridges a larger zone 310 while simultaneously extending outside of zone 310 into the body of the Template 30A. A further variant would be to provide a zone 308 that is fully within larger zone 310. The zone variations are not limited and may be adapted or created by each client-user 1-n, the entity providing the system or others with administrative access to the system.

A further element of the present disclosure is that the work-flow may either be implemented in an ordered or non-ordered manner such that, if a client-user 1-n determines that a certain part of a custom document needs to be generated first in order to lay out the subsequent portions, the client-user 1-n may implement an ordered access in which one personnel member will be provided sole access. Once that zone is established and finalized, a personnel member can be provided access to a subsequent zone. The personnel members may or may not be the same, depending on the designation by the client-user 1-n. Alternatively, the client-user 1-n may permit multiple personnel to access the custom document simultaneously and in any order. Various other access modes may be implements to provide variable workflow where ordered and non-ordered rules/instructions may be employed to permit sections of the custom document to be accessed at any time during the creation process, while other zones may not be capable of being accessed until one or more previous steps or actions are undertaken by some set of personnel who are involved in a prior step or determination.

In order to permit multiple personnel from multiple client-users 1-n to access and employ the system simultaneously, the custom document work-flow may permit personnel to instruct a node-tab engine 120 to contribute, edit, fill in or otherwise modify a Template 30A or multiple Templates 30A. Thus, for example, if multiple custom documents are to be generated, each one of which with a header or logo at the same location, the Rules/Instruction engine 100 may instruct the node-tab engine that the header or logo be inserted in the same zone on each custom document, thus minimizing error and increasing efficiency in the process.

Different personnel at a client-user 1-n may be shown different templates 30, different zones within a given template 30 or may only be shown a zone or template 30 after it has been shown to or worked on by other personnel, based on their specific and assigned roles. For example, personnel with text access rights may not be shown graphic zones and all personnel, other than executive level, may be denied access to accounting zones that may contain confidential information.

The design elements for each client-user 1-n may employ one or more of the hierarchical matrix functions and interfaces within the system. By way of example, the hierarchical matrix may have a custom document workflow from a document to a package to an email, with custom tables for insertion at various zones and ultimate campaign creation through aggregation of custom documents for distribution over a period of time. The custom document workflow is further augmented by a custom data table module that permits dynamic control of numerous content and formatting elements that impact the overall custom document and interface with the client's rules/instructions. The custom data table module may have search capabilities to permit a client to search for and obtain pieces of content for use or may permit the client to display and pull content. Without limiting the various functionalities that may be part of the custom data table, some of the functions that are found therein that benefit the client and contribute to the ease of customizing of documents are dynamic control of images in an Image Library module, dynamic control of content in the content module and dynamic use and modification, if desired, of client rules/instructions that permit the automated integration of the contents, images and other elements that are displayed and the rules/instructions that govern their interrelationship and overall impact.

Whereas one client-user 1-n may want to have a custom document processed and produced for distribution once, another client-user 1-n may also want to establish multiple temporal distribution of one or more custom documents. Accordingly, a client-user 1-n may set up repetitive processing such that the same custom document or package is processed on a regular basis (eg. once a month) to create a cycle and then a series of cycles may be executed to create a campaign.

In one aspect of the present disclosure, a campaign cycle editor may be employed to permit a client-user 1-n to reuse custom documents, combine and recombine them, edit them prior to distribution determine time frames for distribution and otherwise define the properties of any campaign that a client-user 1-n wants to set up.

Once the personnel at a particular client-user 1-n complete their required tasks and employ the node-tab engine 120 to fill in the requisite zones to generate their respective custom documents 122, 124 and 126, those custom documents 122, 124 and 126 can be transmitted to test engine 130 where each can be further examined and reviewed by administrative level personnel at each respective client-user 1-n. The test engine 130 may simultaneously be evaluating and aggregating multiple documents for each client-user 1-n as well as assembling packages for each client-user 1-n to ultimate distribution.

In one aspect of the present disclosure, the test engine 130 may be advantageously employed as a web application (for example, a web portal running on a web page of the world wide web) that the information technology group at the system provider may implement at each client-user 1-n to give each access to their various jobs, packages and Templates 30A that the client-user 1-n may wish to use for processing. After implementation, each client-user 1-n can have the capability of maintaining the system access, jobs, packages, and templates 30 to permit them to make changes as needed and to preview each custom document on the fly. This may permit each client-user 1-n to more rapidly finalize a custom document and elevate it within the client-user 1-n to the appropriate administrative level to obtain approval for distribution.

Following approval, the custom documents 142, 144 and 146 may be transmitted to a storage server 140 for aggregation into packages, for distribution or to be held for further content management. In a further element of the system, the content of each custom document may be managed via a content management processor 150. Each custom document may be accessed and searched by either a keyword or name. To employ a keyword, personnel with appropriate access rights may enter a word or phrase and search one or more of the custom documents to locate the content described. Alternatively, personnel may enter a NAME that will search for any specific designated NAME that has been given to the content (eg. HISTORY) and locate that NAME where it is associated with each custom document.

Once the content has been located, the content management processor 150 of the system can permit appropriately designated personnel to perform one or more of the following content management functions: edit the content, set up new content, alter text or graphics, alter the properties of tie content and search the custom documents to determine how the content edit impacts the remainder of the custom document. The above is not intended to be an exhaustive or a self-limiting list of the content management functions and those skilled in the art will be able to amplify and modify the above.

As is seen illustratively in FIG. 2, FIG. 4 and FIG. 5, the methods of distribution may be by physical mail 142a, attachment to an electronic mail 144a, or via SMS/Text protocol 146a as well as any other desired means. In the event that the transmission means is by physical mail 142a, the custom document or the package 45 may be sent to a print production shop 550 where the physical elements of the package 45 are printed and the package 45 is assembled and sent to a master mail manager 555 for ultimate posting. If the transmission means is electronic, the package 45 may be sent to a master email transmission processor 560 by a workflow manager 565. The email transmission processor 560 may be internal to the client-user 1-n or may be done by the system provider directly or through an outside volume email vendor 570.

The email transmission processor 560 may also be employed in conjunction with a safe e-mail Opt-In module, to permit the transmission of an e-mail communication by a client-user 1-n to a customer rather than sending the material in printed form. The customer can be notified of the ability to receive the material by e-mail and is permitted to Opt-in via a secure communication option. The client 1-n may select any type of unique identification value from an input file in order to permit the secure communication. By way of example only, the client 1-n may employ both the customer's e-mail address and account or member number as a type of unique identification value. The client 1-n has the further option of providing an Opt-in customer with customizable reports and other material and having it delivered electronically, as well as being able to track when it was delivered and when it was opened and read by the Customer.

In yet another aspect, the system can provide the capability of permitting clients 1-n who have financial information or who need to communicate financial data to a customer to do so in a secure environment. The client 1-n may inform the customer of the need to provide confidential information and request that the customer log into a secure site using any one of a number of client 1-n designated authentication field values which can be part of the client 1-n data input file. An example of such an authentication field/value would by a customer's email and Personal Identification Number ("PIN"). Once the customer has complied, they can be directed to a secure mail server module which can give the customer the information and may be capable of transmitting payment receipt data, notification of withdrawal to pay account, and other financial information. The secure mail server module may further provide the client 1-n with a real-time and dynamic history of a customer's payment history and other related information to permit follow up communications and confirmations.

Referring again to FIG. 4, there is shown an illustrative system, in accordance with one aspect of the present disclosure, for the compilation of packages for transmittal, and as an example of a multi-document generation system by a customized document creation system in accordance with an embodiment of the present disclosure. The client-user 1 may access a document selection processor 450 that is functionally associated with a document storage server 460. The client-user 1 can select one or more documents from the document storage server 460, adapt, modify, or otherwise customize them (or not as the client-user 1 determines) through a content management processor 470.

The content management processor 470 may have operational aspects that permit content management processor 470 to search a document library 471 and select a document. The content management processor 470 may have various' screens to permit the client-user 1 to manipulate, edit and customize the selected document. Illustrative screens may include a content property screen 472, a content editor screen 473, a field search screen 474, a content impact screen 475, a production history screen 476 and a content FAQ screen 477. Other screens may be created by the system supplier, either independently or in response to a request by a client-user 1.

Once the client-user 1 has completed generation of the custom document or Documents, they can be transmitted to a data management server 480 where each of the custom documents is reviewed and approved by administrative personnel with appropriate authority. A production file 485 containing the completed set of one or more custom documents can be uploaded and transmitted to a production and transmission server 490.

While the present disclosure has generally be described in relation to the creation of one or more custom documents, certain embodiments of the present disclosure have similar applicability to the creation of document compilations and multipage documents such as reports. Referring to FIG. 4, there is illustratively depicted an aspect of the present disclosure by which the client-user 1-n may elect to generate a report 495A composed of multiple documents or based upon other data and inputs. In such instances, the client-user 1-n may access the document selection processor 450 and a report engine 495 to permit the report 495A to be created either from data on documents, new data imported for the report 495A or other criteria established by the client-user 1-n. The report 495A may be established with named parameters to populate the fields and those parameters may either be included in the report 495A or left out, with just the resulting data being included.

The reports 495A may be printed or emailed whenever there are records and data that meet the criteria set up in Rules/Instruction engine 20. Thus, illustratively, the report 495A may be generated and transmitted whenever there is an accounts receivable update received, or it can be scheduled to go out at the end of each week. Alternatively, it may be scheduled as a one-time report to go out on a given date. The report 495A properties and data may be verified prior to transmittal and may be altered on the fly to eliminate old data and insert new data. Once the report 495A is approved, it may be transmitted to recipients 496 either in physical or electronic format with copies going back to client-user 1. One example of a report 495A that may have old data removed and new data inserted, but that may also have substantial parts untouched is a proxy statement with associated voting requests. Additionally, the Rules/Instruction engine 20 may also include an instruction to transmit a reminder e-mail to the proxy recipient either because it has been determined that a proxy has not been received, or as general reminder, depending on the client's Rule/Instruction. Additional functionality may further include to automated preparation of an election summary report and other summary analyses, depending on the nature of the proxy. This functionality may also be advantageously employed in connection with documents other than proxies where a client determines that they need reminders sent out or that they need to automatically generated interim and final summaries of the response to the mailing.

Referring further to FIG. 5, there is illustratively depicted an access point/distribution point flowchart illustrating a custom document methodology and system for generation, finalization, and transmittal of customized documents by the system in accordance with an embodiment of the present disclosure. Each client-user 1-n may be allowed direct access to the system through its own UI 15 to its portal 500 or may access the system through the system provider's website 505. Each client-user 1-n may also access or provide its personnel access to and interface with the system's production processors 510 and test processors 515 which are used for processing all jobs and Templates 30A.

Each client-user 1-n may also preview all custom documents and alterations or changes to custom documents on the fly through the production processor 510 and test processor 515. Each of the client-users 1-n access and view points can permit e-mail interaction between internal personnel at each client-user 1-n and the system so that the personnel, depending on access privileges allotted to each of them, can either view, change, manipulate and or finally approve for transmittal the final custom document or package 45 without having to go to the system provider's facility.

Each client-user 1-n can be provided access to a presentment engine 520 through secure, client-user 1-n code protected transmission means 525 which also permit additional access to an application programming interface ("API") engine 530 and a file transfer protocol ("FTP") engine 535. The File Transfer Protocol is a standard network protocol used to transfer computer files from one host to another host over a TCP-based network, such as the Internet.

The API engine 530 can specify how the software components should interact with each other. In addition to accessing databases or computer hardware, such as hard disk drives or video cards, the API engine 530 can be used to ease the work of programming graphical user interface components. The API engine 530 can come in the form of a library that includes specifications for routines, data structures, object classes, and variables or, notably for SOAP and REST services, the API engine 530 comes as just a specification of remote calls exposed to the API engine 530 client-users 1-n.

The FTP engine 535 may be built on a client-server architecture and use separate control and data connections between the client-user 1-n and the server. FTP client-users 1-n may authenticate themselves using a clear-text sign-in protocol, normally in the form of a username and password, but can connect anonymously if the server is configured to allow it. For secure transmission that protects the username and password, and encrypts the content, the FTP engine 535 may be secured with SSL/TLS (FTPS). SSH File Transfer Protocol (SFTP) may sometimes also used instead, but is technologically different.

Referring further to FIG. 5, it can be appreciated that the access points and related engines require control and interaction and are viewed by an SQL server 540 that serves as the principal relational database management system. Structured Query Language ("SQL") is a special-purpose programming language designed for managing data held in a relational database management system (RDBMS). SQL includes a data definition language and a data manipulation language. The scope of SQL includes data insert, query, update and delete, schema creation and modification, and data access control. Although SQL is often described as, and to a great extent is, a declarative language it also includes procedural elements.

SQL server 540 may advantageously use a common set of tools to deploy and manage databases both on-premises, at the system provider and in the cloud, which may make it easier for client-user1-n to take advantage of all three. The SQL server 540 may access and manage the system provider's IT engine 550, which may include one or more back-up servers 551, tape drives 552, file servers 553 and a Dialogue/HP EX STREAM engine 554 through which the system provider's IT department can interact with the client-user 1-n and the custom documents.

Moreover, the SQL server 540 may also access and manage the print stream engine 560 and workflow engine 570 through data insert, query, update and delete, schema creation and modification, and data access control, thereby ensuring that the information from the production engine 510 and test engine 515 are properly integrated, applied and transmitted. As a part of the access and control, the Dialogue/HP EX STREAM engine 554 may, in conjunction with the workflow engine 570, specify and access a PS/PDF file server 575 to direct a print function 575A.

As a further aspect of an element and functionality of the present disclosure, the system, through its Review Output module, can permit each client to review a pdf of the live record output and all of the records that form part of a prospective mailing package before it is sent to the production department. The Review Output module may allow for a review of all records before they complete processing and reach the production department. A client can review each file that is then pending and "Ready for Review" and can select that file or files that are representative of the mailing package. If a file is not yet ready for review, the Review Output module can list that file as "Importing" or by some other designation that indicate it is still being processed prior to review. Use of the Review Output module permits a client to check each inventory item associated with a file and permits the client to reject any record or other data entry that they ultimately do not want to make part of the final file processing.

Upon receipt of final, confirmed authorization from appropriate personnel at the client-user 1-n that a custom document is to be transmitted and the mode of transmission is designated, SQL server 540 may direct either the workflow engine 570 or a mail manager engine 580 to transmit the custom document. The transmittal may be either by physical deliver, email attachment, SMS/Text or other client-user 1-n designated transmittal modes.

Without seeking to limit scope of the invention, other aspects and functionality may be appreciated by referring to FIG. 1 through FIG. 5 and the above specification wherein the following interactions and applications may be employed to further enhance the ability of client-user 1-n to create, finalize, have published (in electronic, physical, or other format) and transmit data and custom documents.

Client-user 1-n and/or their customers may access web applications (Web apps). Web applications can act as clients to SQL server 540 behind a firewall. Website information may be served only via SSL-encrypted channel unless specifically requested by a client-user 1-n.

Prod/Test can be the web application or environment that the IT department uses to implement all clients with the jobs and templates that will be used for processing. After implementation, most clients take over maintenance and keep making changes as needed. Changes can be previewed on the fly and go through an elevation process that requires approval from the appropriately designated users.

API web services can be provided to a client-user 1-n that wants to interface their code with the system's functionality such as recall and generate PDF information from archived data.

API Push web services can be provided to clients that want to interface their code with the system's functionality to submit one-off/push data that will be used for creating PDF output and become available for accessing via FTP, Download or Email.

Custom data file formats may be supported for client-user 1-n data submitted into/out from the system provider. client-user 1-n may have the option to manually submit files on irregular schedules or to code file transmission to happen on a scheduled basis.

Unlike the API web services, some Client-user 1-n may want to integrate their customer website's code to only show an embedded web page that the system provide hosts for searching, listing and accessing PDF files of all items mailed or emailed to the client-user 1-n customers. This set of web pages may be provided over an SSL-encrypted channel that accepts the appropriate parameters to ensure the client-user 1-n requested data is displayed and ready to be accessed by their customers.

Workflow Manager can guide the file received from the client-user1-n through the whole process (workflow) until the PS (PostScript), AFP or PDF output is created. Files can be picked up from FTP, parsed into the SQL server 540 database, inserted into the appropriate tables, based on custom client-defined rules/instructions, the workflow then goes on to validate mail address with the CAS SNCOA (national change of address) service with the mail manager engine 580 for transmittal. Changed addresses can be updated in the database, invalid addresses can be rejected into a file to be sent to the client-user 1-n or ignored (based on custom rules/instructions). Splits based on presort sequence and mailing rules/instructions may be created to maximize the client-user 1-n savings on postage. As a further part of the Workflow Manager, the system can permit validation of both the delivery and the delivery point within the workflow process. Thus, when an email communication is bounced back or it otherwise not deliverable or is not read within a client defined time/data range, the system can determine the non-delivery and can generate a "hard copy" of the communication with attachments. That "hard copy" can be deemed a package and can be mailed to ensure that they communication is ultimately delivered to the customer. The email reports section of the Workflow Manager can also provide a Query Builder module that permits a client to determine if an email is "Successful" in that it has been delivered. The Workflow Manager can also provide validation that the delivery point is correct and that the various elements of the delivery point coordinate with one another. Thus, by way of example, the Delivery Point Validation may note that the city of destination is New York, but that the zip code is for an area in New Jersey. Other forms of Delivery Point Validation are within the scope of the present disclosure to further ensure the accuracy and deliverability of each communication, such as automatic detection of domains that do not exist, an incorrect domain extension or other types of transmission errors or rejections.

Dialogue/HP Exsteam services may be invoked to create the PS/PDF files that will be sent to the system provider's production floor. In the cases where the workflow requires emailing instead of mailing, the workflow may be instructed to avoid processing the extra steps that would be required for mailing. Email addresses are validated and sent through a volume email vendor by using their web services. Results from the email submission action are reflected back into the database.

PS/PDF/AFP files may be directed the workflow engine 570 to be printed into the corresponding paper, preprinted materials are inserted, folded, package is inserted into envelope and mailed out.

SQL server 540 databases may contain historical data that will be retained for the duration of the archival/retention period (customized by client-user 1-n request). This data can be used to regenerate any mailed item within the retention period. Review, re-prints are available from within the system to convert into PDF for printing on a one-off basis.

Dialogue/HP Exstream engine 554 may be employed to transform data from a database into PostScript, AFP and PDF files. The Dialogue/HP Exstream engine 554 allows embedding PS/AFP control code for indicating high volume printers to execute tray selection with different media, inserting pre-printed documents, duplex and simple printing within the same job and other functionality available in high volume printers and inserters. Generally, the system provider's IT group programs and sets up the Templates 30A corresponding to the scope of the initial implementation for each client.

A PrintStream engine 590 may be used to manage the business process to manage all aspects of a print and letter shop, including mailing costs. In one embodiment, information may be sent to the PrintStream engine 590 in such a manner as to avoid multiple repetitive data entry points and minimize data entry errors and costs.

The backup engine 551 can be used to run backups of all servers. Backups can be sent to a secure facility.

Figure 6:
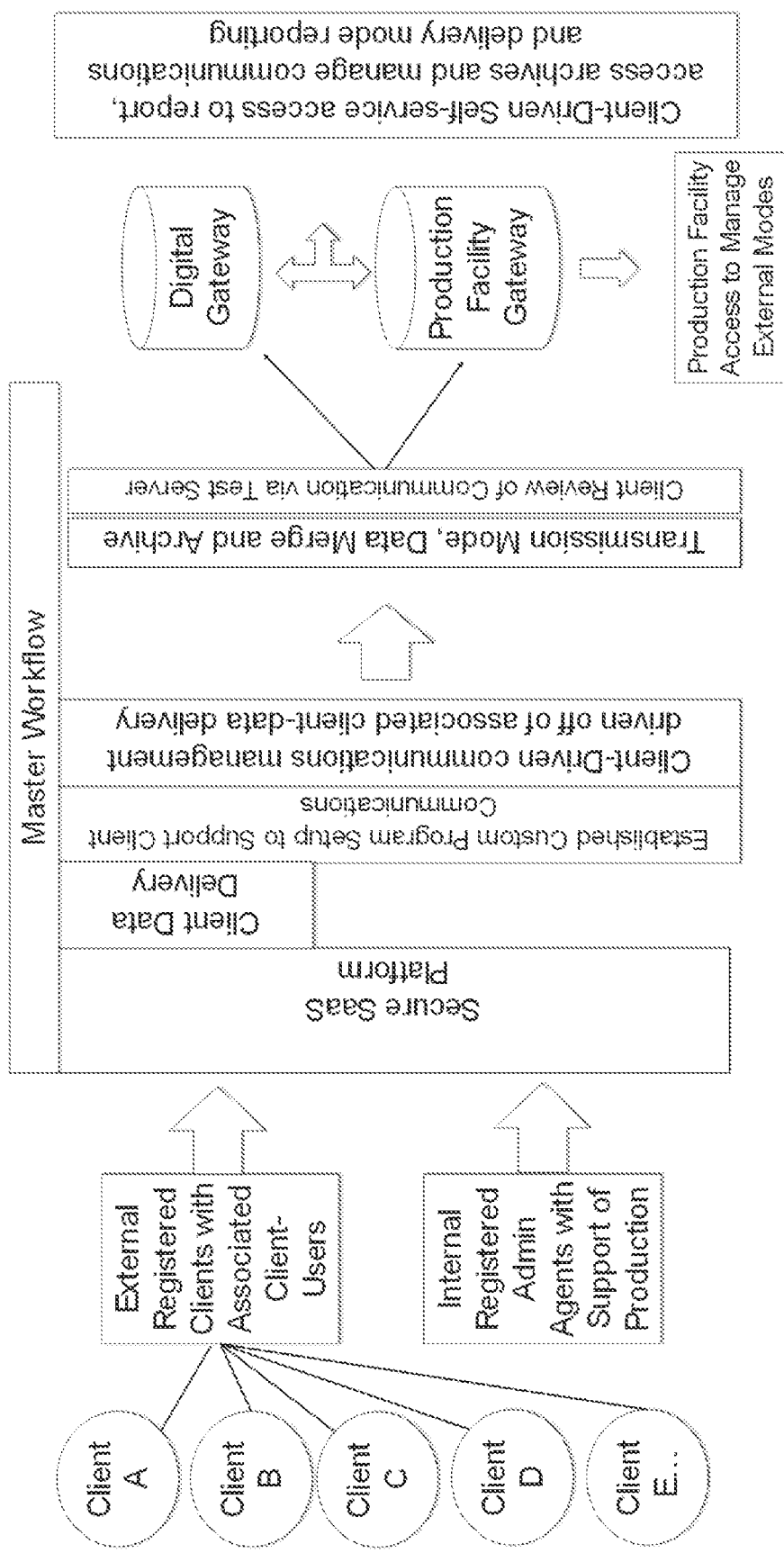
FIG. 6 illustrates an architecture of a system according to certain embodiments of the present disclosure.

FIG. 6 illustrates an architecture of a system according to certain embodiments of the present disclosure. As shown in FIG. 6, there can be multiple clients, Client A, Client B, etc. These clients can be external registered clients associated with client-users. The client-users can be users with, for example, login credentials, who are associated with at least one corresponding claim. There can also be internal registered administrative (admin) agents with support of production. Both kinds of users can access a secure SaaS platform. The platform can be provided to receive client data delivery. The platform can also have an established custom program setup that can help to support client communications. Furthermore, the platform can provide client-driven communications management driven off of associated client-data delivery.

The platform may provide a transmission mode (whether transmitting digitally or in print, for example), as well as data merge and archive features. For example, the platform can be connected to a digital gateway and a production facility gateway. The latter can provide access to a production facility to manage external modes. The platform can also provide client-driven self-service access to report, access archives, and manage communications and delivery mode reporting.

Figure 7:
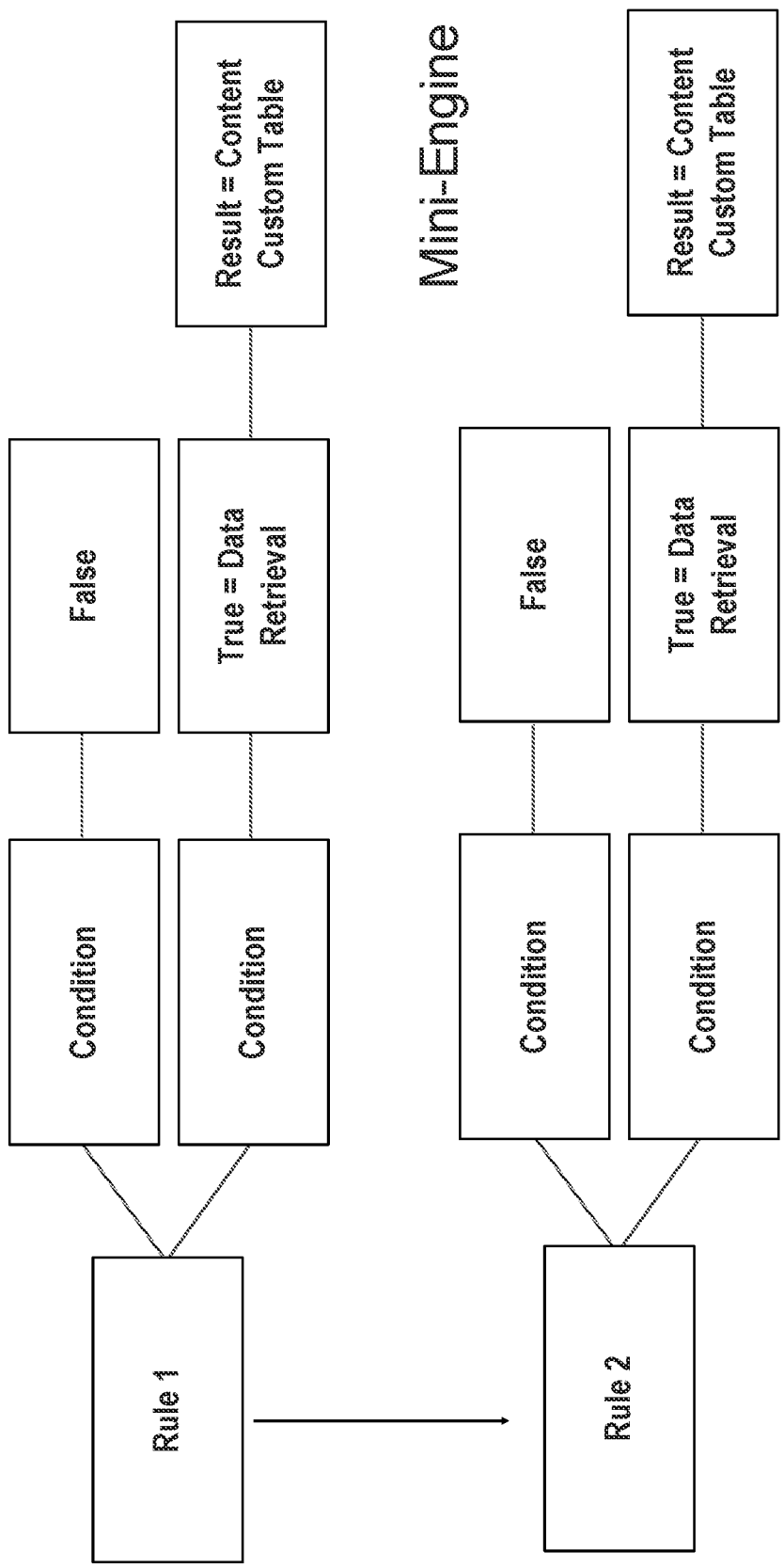
FIG. 7 illustrates a mini-engine according to certain embodiments of the present disclosure.

FIG. 7 illustrates a mini-engine according to certain embodiments of the present disclosure. A mini-engine, as illustrated may sequentially process more than one rule (two rules are shown, but many more than two rules can be used). For each rule, there may be an action taken if the condition is false, and an action taken if the rule is true. In this example, for both rule 1 and rule 2, no further action on that rule is taken if the condition is false. If the condition is true, however, in each case there can be a data retrieval. Date information can be one example of data retrieval, but other information include graphics, video, or audio can be the retrieved data. The result can be a content custom table corresponding to each rule. This can be the same as the custom data table discussed above. Moreover, this mini-engine may be one of the engines described with reference to the system workflow and engines design in FIG. 8.

Figure 8:
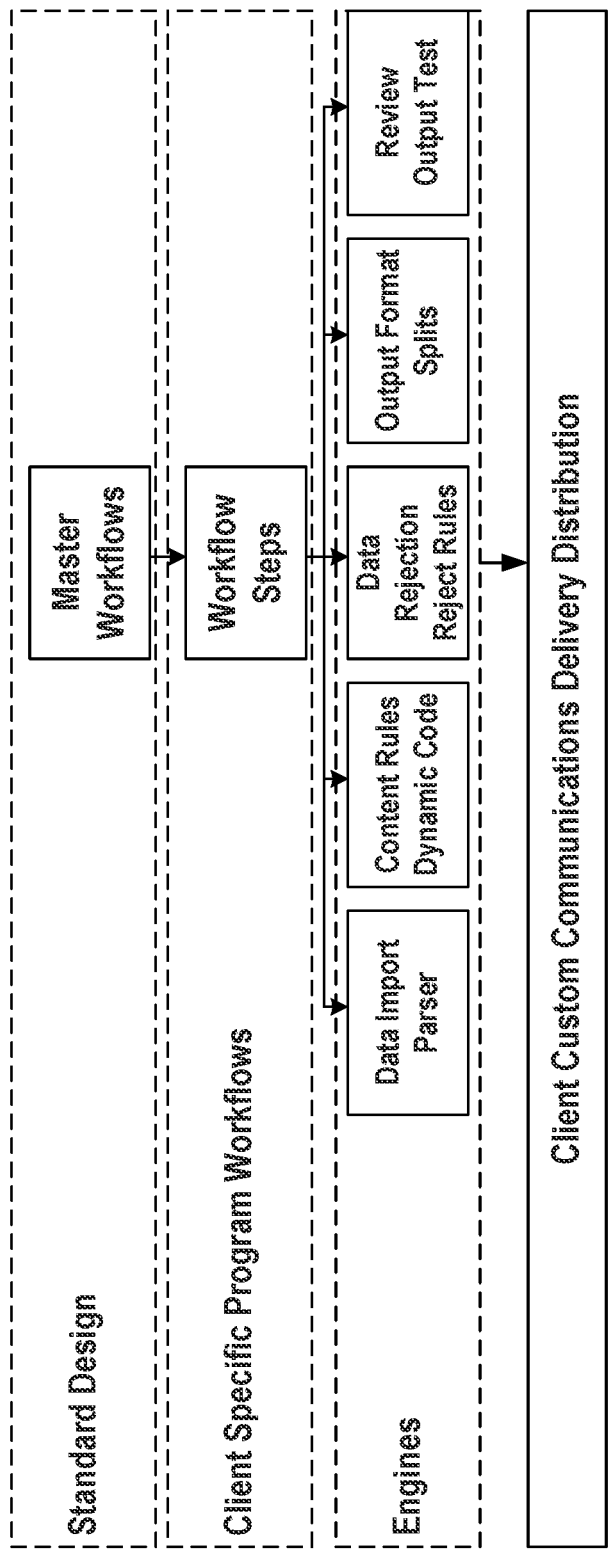
FIG. 8 illustrates an architecture of a content delivery system according to certain embodiments of the present disclosure.

FIG. 8 illustrates an architecture of a content delivery system according to certain embodiments of the present disclosure. As shown in FIG. 8, there can be several layers of the architecture. At a standard design layer there can be master workflows. These may be relatively generic workflows that could be applicable to many different clients. In a second layer, there can be client-specific program workflows. These workflows may be customized to a particular client. This customization may take place automatically by presenting a series of queries, or one or more forms to a client-user. Alternatively, this customization may be performed manually by staff of the company providing the software as a service, perhaps after interviewing the client or a client-user thereof.

In order to accomplish the workflow steps, a variety of engines may be provided. These engines may be implemented in hardware, software running on hardware, or any combination thereof. The data import parser may receive data from the client, for example from a client-user, and extract data to be included in a communication. The parser may be data agnostic based on single- or multi-data file import.

The content rules data dynamic code (illustrated, by way of example, in FIG. 7) may provide for the inclusion of the data, where appropriate, into a table. The data rejection reject rules may handle cases where a "false" result is reached in FIG. 7, or when data otherwise must be rejected. The data rejection reject rules may be created to identify and reject records based on client-defined requirements. These data rejection rules may be run on data provided by the client (for example, the client-user) and they may also be run on the data created by the content rules dynamic code engine.

The content rules data dynamic code can tie communications to the templates. The dynamic code can create content within zones or locations of the templates. This content may be content from the client or the dynamically generated content generated by the engine. Rules can be assigned to content and zones. During workflow, a content rules engine can look for true conditions in order to manage content, as illustrated in FIG. 7. Any arbitrary number of rules can be created and associated with a given client-specific program. Rules can also have one or any arbitrarily large number of conditions. Rules ending with no true conditions can be returned to a default condition. The default condition may have no data, for example blank, or have some other data: for example, "TBD" if a date has not been identified and the rule seeks date data.

The output format splits may format the data in the table into a presentation. These splits may split the tabled data differently into various communications. For example, a campaign or package may include various types of communication: for print communication audio and video data may be unhelpful, for email campaigns linked or embedded content may be needed, whereas for a social media platform communication excessive textual content may be unnecessary. The review output test engine may then provide the resulting communication or communications to the client, for example, to a client-user with approval rights, for approval, before client custom communication delivery distribution occurs. In certain embodiments, the first time the client-user has seen the communication is when the review output test engine provides it. Thus, for example, this may not simply be a print-preview of a document already seen by the client-user. Instead, this may be a review a new communication that was generated by the output format splits engine or another engine or engines based on the data provided by the client. The review output test engine may allow user control over files and records processed to validate or test output prior to delivery/distribution. For example, the system may generate a plurality of different types of communications based on a single client-user data file, and the review output test engine may provide each such communication to a client-user of the client for review and approval.

The data fields in the templates of certain embodiments of the present disclosure may be controlled or otherwise driven by the use of content rules based on multi-factor conditions. These rules may permit for revised rules to be applied to data to create new data fields that drive additional content creation based on conditions. Thus, the engines may not be limited solely to data provided by the client-user, but may generate additional data based on the rules and the imported data.

An intelligent merge process can be used to dynamically adjust communication content based on customized rules that create intelligent decisions to inject contextual data. Thus, data from the client or any client-user thereof, can be merged with other data, which can be referred to as contextual data. Contextual data may be gleaned from a library of such data, from other data from the client or client-user on this or another occasion, or the like. For example, the content rules dynamic code engine can create new data fields, images, or complex content based on dynamic rules driven by client-specific requirements.

Each of the illustrated engines can be customized to client-specific rules based on communication and delivery requirements.

According to one aspect of the present disclosure, a client-user implemented document and communication creation system for generating a communication using a remote terminal remote from the system, can include at least one memory including computer program instructions and at least one processor that may be accessed remotely by the terminal. The at least one memory and the computer program instructions can be configured to, with the at least one processor, cause the system at least to store at least one client-user generated rule/instruction. The at least one memory and the computer program instructions can also be configured to, with the at least one processor, cause the system at least to provide at least one template wherein the template has a data-insertable zone therein. The at least one memory and the computer program instructions can further be configured to, with the at least one processor, cause the system at least to receive client-user specified data insertion instructions comprising client-user specified data from the remote terminal to the processor. The at least one memory and the computer program instructions can additionally be configured to, with the at least one processor, cause the system at least to process the transmitted client-user specified data insertion instructions in accordance with one or more client-user generated rule/instruction of the at least one client-user generated rule/instruction. The at least one memory and the computer program instructions can also be configured to, with the at least one processor, cause the system at least to insert the received client-user specified data into the zone, in accordance with at least one client-user generated rule/instruction. The at least one memory and the computer program instructions can further be configured to, with the at least one processor, cause the system at least to process a final approval of the communication containing the client-user specified data. The at least one memory and the computer program instructions can additionally be configured to, with the at least one processor, cause the system at least to process a transmission mode specification. The at least one memory and the computer program instructions can also be configured to, with the at least one processor, cause the system at least to transmit the finally approved communication in accordance with the transmission mode specification.

In some embodiments, the specified data comprises text.

In some embodiments, the specified data comprises graphic materials.

In some embodiments, the specified data comprises visual material.

In some embodiments, the processing the transmitted client-user specified data insertion instructions comprises generating data based on the one or more client-user generated rule/instruction.

In some embodiments, the system can further include template storage. The template storage may together with or separate from the memory storing the computer program instructions.

In some embodiments, the system can further include communication storage. The communication storage may together with or separate from the memory storing the computer program instructions.

In some embodiments, the finally approved communication can include a proxy and the at least one memory and the computer program instructions can be configured to, with the at least one processor, cause the system at least to receive an on-line line response from a recipient of a proxy or other material by electronic response or hard copy response converted to electronic format.

In some embodiments, the at least one memory and the computer program instructions can be configured to, with the at least one processor, cause the system at least to present material for review at a plurality of points in the production cycle to ensure compliance with at least one of a client-user's internal rules or compliance with state, federal, or other statutory or regulatory rules.

In some embodiments, the client-user specified data insertion instructions obtain the data from a communication in the communication storage.

In some embodiments, the at least one memory and the computer program instructions can be configured to, with the at least one processor, cause the system at least to present compliance with the client-user specified data instructions in real time.

In some embodiments, the at least one memory and the computer program instructions can be configured to, with the at least one processor, cause the system at least to perform communication aggregation.

In some embodiments, multiple communications can be aggregated and transmitted as a single communication.

In some embodiments, the transmission mode can be one or more of the following: physical delivery; electronic delivery; electronic mail attachment delivery; or SMS/text delivery.

According to another aspect of the present disclosure, a method for generating a client-user created and implemented document and communication using a terminal that is interconnected remotely to the system can include storing at least one client-user generated rule/instruction. The method can also include providing at least one template. The template can have a data-insertable zone therein. The method can further include receiving client-user specified data insertion instructions that include client-user specified data from the remote terminal to the processor. The client-user specified data can be included directly or referentially, such as by a link or other directions to data stored on a server. The method can additionally include processing the transmitted client-user specified data insertion instructions in accordance with one or more client-user generated rule/instruction of the at least one client-user generated rule/instruction. The method can also include inserting the received client-user specified data into the zone, in accordance with at least one client-user generated rule/instruction. The method can further include processing a final approval of the communication containing the client-user specified data. The method can additionally include processing a transmission mode specification. The method can also include transmitting the finally approved communication in accordance with the transmission mode specification.

In some embodiments, the processing the transmitted client-user specified data insertion instructions can include generating data based on the one or more client-user generated rule/instruction.

In some embodiments, the finally approved communication can include a proxy and the method can further include receiving an on-line line response from a recipient of a proxy or other material by electronic response or hard copy response converted to electronic format.

In some embodiments, the method can further include presenting data for review at a plurality of points in the production cycle to ensure compliance with at least one of a client-user's internal rules or compliance with state, federal and other statutory or regulatory rules.

In some embodiments, the processing the transmitted client-user specified data insertion instructions comprises generating data based on the one or more client-user generated rule/instruction.

In some embodiments, the method can further include comprising aggregating a plurality of communications.

In some embodiments, the method can further include aggregating and transmitting multiple communications as a single communication.

The foregoing description of the specific embodiments will so fully reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

The breadth and scope of the present disclosure should not be limited by any of the above-described exemplary embodiments, but should be defined only in accordance with the following claims and their equivalents.

What is claimed is:

1. A client-user implemented document and communication creation system for generating a communication using a remote terminal remote from the system, the system comprising:
   at least one memory including computer program instructions; and
   at least one processor that may be accessed remotely by the terminal,
   wherein the at least one memory and the computer program instructions are configured to, with the at least one processor, cause the system at least to:
   store at least one client-user generated rule/instruction;
   provide at least one template wherein the template has a data-insertable zone therein;
   receive client-user specified data insertion instructions comprising client-user specified data from the remote terminal to the processor;
   process the transmitted client-user specified data insertion instructions in accordance with one or more client-user generated rule/instruction of the at least one client-user generated rule/instruction;
   insert the received client-user specified data into the zone, in accordance with at least one client-user generated rule/instruction;

process a final approval of the communication containing the client-user specified data;

process a transmission mode specification; and transmit the finally approved communication in accordance with the transmission mode specification.

2. The system of claim 1, wherein the specified data comprises text.

3. The system of claim 1, wherein the specified data comprises graphic materials.

4. The system of claim 1, wherein the specified data comprises visual material.

5. The system of claim 1, wherein the processing the transmitted client-user specified data insertion instructions comprises generating data based on the one or more client-user generated rule/instruction.

6. The system of claim 1, further comprising template storage.

7. The system of claim 1, further comprising communication storage.

8. The system of claim 1, wherein the finally approved communication comprises a proxy and wherein the at least one memory and the computer program instructions are configured to, with the at least one processor, cause the system at least to:

receive an on-line line response from a recipient of a proxy or other material by electronic response or hard copy response converted to electronic format.

9. The system of claim 1, wherein the at least one memory and the computer program instructions are configured to, with the at least one processor, cause the system at least to present material for review at a plurality of points in the production cycle to ensure compliance with at least one of a client-user's internal rules or compliance with state, federal, or other statutory or regulatory rules.

10. The system of claim 7, wherein the client-user specified data insertion instructions obtain the data from a communication in the communication storage.

11. The system of claim 1, wherein the at least one memory and the computer program instructions are configured to, with the at least one processor, cause the system at least to present compliance with the client-user specified data instructions in real time.

12. The system of claim 1, wherein the at least one memory and the computer program instructions are configured to, with the at least one processor, cause the system at least to perform communication aggregation.

13. The system of claim 12, wherein multiple communications are aggregated and transmitted as a single communication.

14. The system of claim 1, wherein the transmission mode is one or more of the following: physical delivery; electronic delivery; electronic mail attachment delivery; or SMS/text delivery.

15. A method for generating a client-user created and implemented document and communication using a terminal that is interconnected remotely to the system, the method comprising:

storing at least one client-user generated rule/instruction;

providing at least one template wherein the template has a data-insertable zone therein;

receiving client-user specified data insertion instructions comprising client-user specified data from the remote terminal to the processor;

processing the transmitted client-user specified data insertion instructions in accordance with one or more client-user generated rule/instruction of the at least one client-user generated rule/instruction;

inserting the received client-user specified data into the zone, in accordance with at least one client-user generated rule/instruction;

processing a final approval of the communication containing the client-user specified data;

processing a transmission mode specification; and transmitting the finally approved communication in accordance with the transmission mode specification.

16. The method of claim 15, wherein the finally approved communication comprises a proxy, the method further comprising:

receiving an on-line line response from a recipient of a proxy or other material by electronic response or hard copy response converted to electronic format.

17. The method of claim 15, further comprising:

presenting data for review at a plurality of points in the production cycle to ensure compliance with at least one of a client-user's internal rules or compliance with state, federal and other statutory or regulatory rules.

18. The method of claim 15, wherein the processing the transmitted client-user specified data insertion instructions comprises generating data based on the one or more client-user generated rule/instruction.

19. The method of claim 15, further comprising aggregating a plurality of communications.

20. The method of claim 19, further comprising:

aggregating and transmitting multiple communications as a single communication.

* * * * *